(12) United States Patent
Pavlyushchik

(10) Patent No.: US 7,526,516 B1
(45) Date of Patent: Apr. 28, 2009

(54) SYSTEM AND METHOD FOR FILE INTEGRITY MONITORING USING TIMESTAMPS

(75) Inventor: Mikhail A. Pavlyushchik, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 252 days.

(21) Appl. No.: 11/461,499

(22) Filed: Aug. 1, 2006

Related U.S. Application Data

(60) Provisional application No. 60/803,255, filed on May 26, 2006.

(51) Int. Cl.
*G06F 12/00* (2006.01)
*G06F 17/30* (2006.01)
*H04L 9/00* (2006.01)

(52) U.S. Cl. ...................... 707/205; 713/165
(58) Field of Classification Search ............... 707/204; 713/165
See application file for complete search history.

(56) References Cited

U.S. PATENT DOCUMENTS

| | | | |
|---|---|---|---|
| 6,647,400 B1 | 11/2003 | Moran | |
| 6,826,697 B1 | 11/2004 | Moran | |
| 7,032,114 B1 | 4/2006 | Moran | |
| 7,228,437 B2* | 6/2007 | Spagna et al. | 713/193 |
| 2003/0140049 A1* | 7/2003 | Radatti | 707/100 |
| 2003/0208511 A1* | 11/2003 | Earl et al. | 707/204 |
| 2004/0230624 A1* | 11/2004 | Frolund et al. | 707/204 |
| 2004/0260735 A1* | 12/2004 | Martinez et al. | 707/204 |
| 2005/0071631 A1 | 3/2005 | Langer | |
| 2005/0120239 A1* | 6/2005 | Monroe et al. | 713/201 |
| 2005/0187991 A1* | 8/2005 | Wilms et al. | 707/204 |
| 2005/0187992 A1* | 8/2005 | Prahlad et al. | 707/204 |
| 2005/0193043 A1* | 9/2005 | Hoover | 707/204 |
| 2005/0278397 A1* | 12/2005 | Clark | 707/204 |
| 2006/0053181 A1* | 3/2006 | Anand et al. | 707/204 |
| 2006/0129618 A1* | 6/2006 | Maier | 707/204 |
| 2007/0083722 A1 | 4/2007 | Per et al. | |
| 2007/0157315 A1 | 7/2007 | Moran | |
| 2007/0220511 A1 | 9/2007 | Clarke et al. | |

FOREIGN PATENT DOCUMENTS

WO  0116709  3/2001

OTHER PUBLICATIONS

Zhang, Rui; Commit phase in timestamp-based stm; Jun. 1998; ACM; ISBN: 9781595939739, pp. 326-335.*

* cited by examiner

*Primary Examiner*—Jermaine Mincey
(74) *Attorney, Agent, or Firm*—Bardmesser Law Group

(57) ABSTRACT

A system, method and computer program product for monitoring file integrity that includes intercepting a function call by a user application to change a timestamp of a file; updating a record of a number of times the timestamp has been changed, wherein the record is maintained in operating system space; in response to a monitoring application requesting the record, providing, to the monitoring application, the record for comparison with information maintained by the monitoring application; and changing behavior of a user application if the record does not correspond to the information maintained by the monitoring application. This can be performed for multiple files, and each file can have a corresponding record. The records can be maintained in a database in operating system space. The monitoring application can maintain a database of a number of times the timestamps of the files have been modified. The record is, e.g., a counter.

19 Claims, 10 Drawing Sheets

Conventional operation

Operation with the interceptor added

SYSTEM AND METHOD FOR FILE INTEGRITY MONITORING USING TIMESTAMPS

CROSS REFERENCE TO RELATED APPLICATIONS

This application is a non-provisional of U.S. Provisional Patent Application No. 60/803,255, filed May 26, 2006, entitled SYSTEM AND METHOD FOR FILE INTEGRITY MONITORING USING TIMESTAMPS, which is incorporated herein by reference in its entirety.

BACKGROUND OF THE INVENTION

1. Field of the Invention

The present invention is related to monitoring file integrity, and more particularly, to a more reliable method of using timestamps to verify whether or not a file has been modified.

2. Description of the Related Art

File integrity is important in many computer applications. There are many applications where knowledge of whether the file has been modified is important—for example, where the user is trying to restore the state of the system (or the state of an application) to what it was at some earlier point in time. Also, files can be changed accidentally or deliberately, the file can overwritten, portions of files can be overwritten accidentally or intentionally, etc. For example, in the context of virus protection and protection from other malware risks, it is important to know whether or not a particular file has been modified.

There are two conventional methods for testing whether a particular file has been modified. The first method involves the use of timestamps. All modern operating systems have a facility for keeping track of the last date and time when the file was modified. However, the problem with relying solely on this operating system utility is that a user application normally has rights to modify the timestamp directly. Thus, a malicious application could easily take advantage of this fact by saving the earlier timestamp of the file, and, after modifying the file, replacing the new timestamp with the timestamp of that file prior to the modification. Therefore, a check that relies only on the timestamp would show that the file had not been modified, when, in fact, it had been. At the same time, disabling the ability of user applications to change file timestamps is often impossible, since there are legitimate applications that may need to access and alter the timestamps.

FIG. 1A illustrates a timeline of how the monitoring that only relies on the files systems timestamp function can be subverted. As shown in FIG. 1A, at the time t1, the file has a Timestamp A. After that point in time, a request to the file system will produce a response that corresponds to the Timestamp A.

Subsequently, the file has been modified, and now has a Timestamp B, at the time t2. At that point, a request to the file system will result in a response that corresponds to the Timestamp B.

At the time t3, a malicious application directly accesses the timestamps and modifies the timestamp from B back to A, therefore, a request to the file system after that point will produce a response that corresponds to the timestamp A which does not reflect the fact that the file has been modified in the meantime.

Another approach to tracking file modifications involves the use of various functions, typically one-way functions, such as hashes. A hash is a one-way transformation of a file into a (usually) much smaller binary value, so that a change in the content of the file would normally produce a different hash value. The MD5 hash function is frequently used in many computer applications of this kind. The problem with this approach is that generating hash values is a relatively computationally intensive task, particularly for large files. For example, many current applications require loading of multi-megabyte files into memory, prior to execution. If it were necessary to generate a hash of these files every time the application were launched, the user would suffer from a long delay before the application actually is up and running. Today, most users would find this annoying and irritating.

Accordingly, there is a need in the art for a fast mechanism that permits checking whether or not a file has been modified.

SUMMARY OF THE INVENTION

Accordingly, the present invention is related to a system and method for monitoring file integrity using timestamps that substantially obviates one or more of the disadvantages of the related art.

In one aspect of the invention, there is provided a system, method and computer program product that includes intercepting a function call by a user application to change a timestamp of a file; updating a record of a number of times the timestamp has been changed, where, optionally the record is maintained in operating system space; in response to a monitoring application requesting the record, providing, to the monitoring application, the record for comparison with information maintained by the monitoring application; and taking a specified action (e.g., starting an antivirus scan, or informing a user) if the record does not correspond to the information maintained by the monitoring application. This process can be performed for multiple files, and each file can have a corresponding record. The records can be kept in a database in operating system space. The monitoring application can maintain a database of a number of times the timestamps of the files have been modified. The record is, e.g., a counter.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

The present invention relies on the timestamp mechanism of the operating system to provide an indication that a file has been modified. In one embodiment, a driver is added to the operating system, whose purpose is to keep track of file accesses for all files, for a single file, or for some subset of files that is of a particular interest.

The present invention is also based on the property of the file system to change the timestamp automatically whenever a file is modified. In order to change the timestamp and only the timestamp, it is necessary to call an operating system function responsible for changing timestamps. Accordingly, a driver can be added to the operating system whose primary purpose is to track whether the function that updates the timestamp has been invoked. The driver is essentially a module added to the operating system which provides additional services to the user applications. For example, the driver can intercept such requests and maintain a counter in its database for each file at issue. When the timestamp function is invoked, the counter is incremented by one. Thus, monitoring application can later compare the previous values of the counter and the timestamp with current values of the counter and the timestamp and determine which file at issue has in fact been written to.

With this information, it is possible to then decide whether the file needs further analysis. For example, in the case of antivirus software, if the driver's database shows that the timestamp has not been affected since some previous point in time, it is probably not necessary to go through a procedure that checks whether the file contains a virus. If the counter shows that the timestamp has been updated, and the timestamp remains unchanged, this may be treated as an indication that something has changed or corrupted the file, such as a virus, and closer attention should be paid to that file.

Figure 1A:
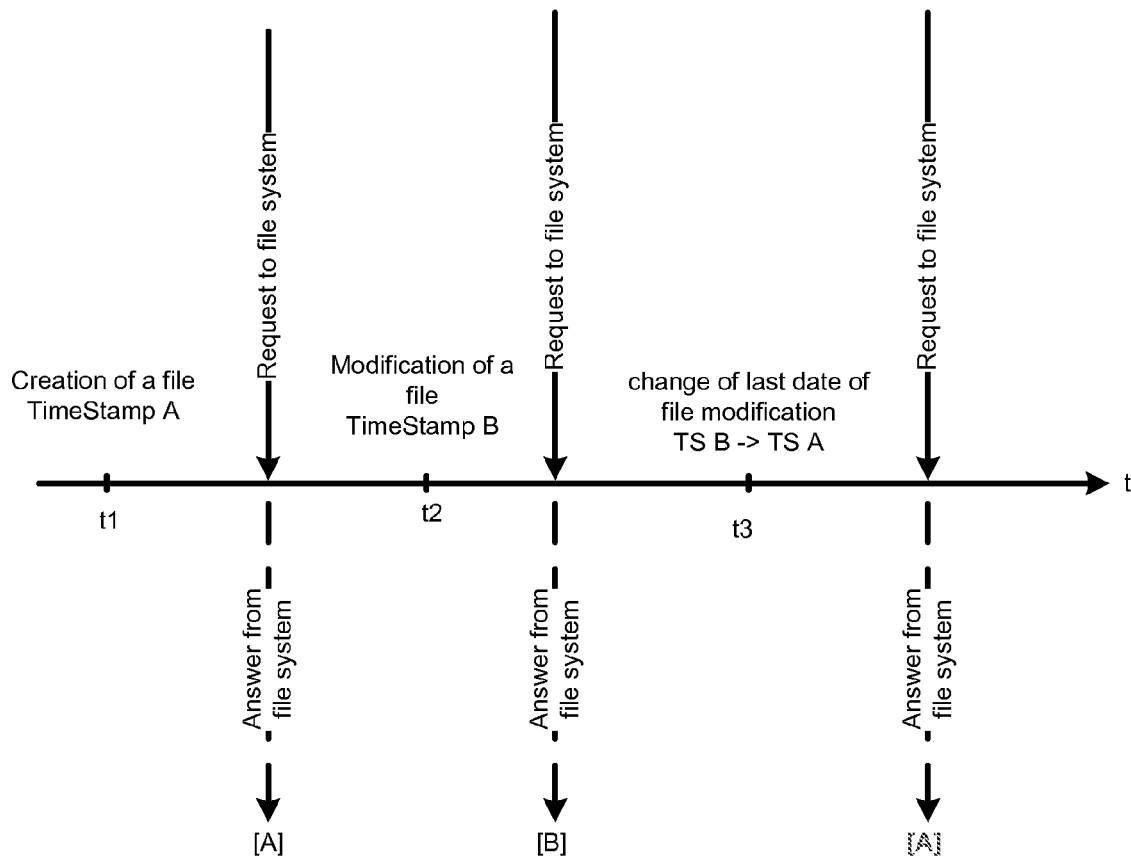
FIG. 1A illustrates a timeline of how the monitoring that only relies on the conventional file system's timestamp function can be subverted.
Figure 1B:
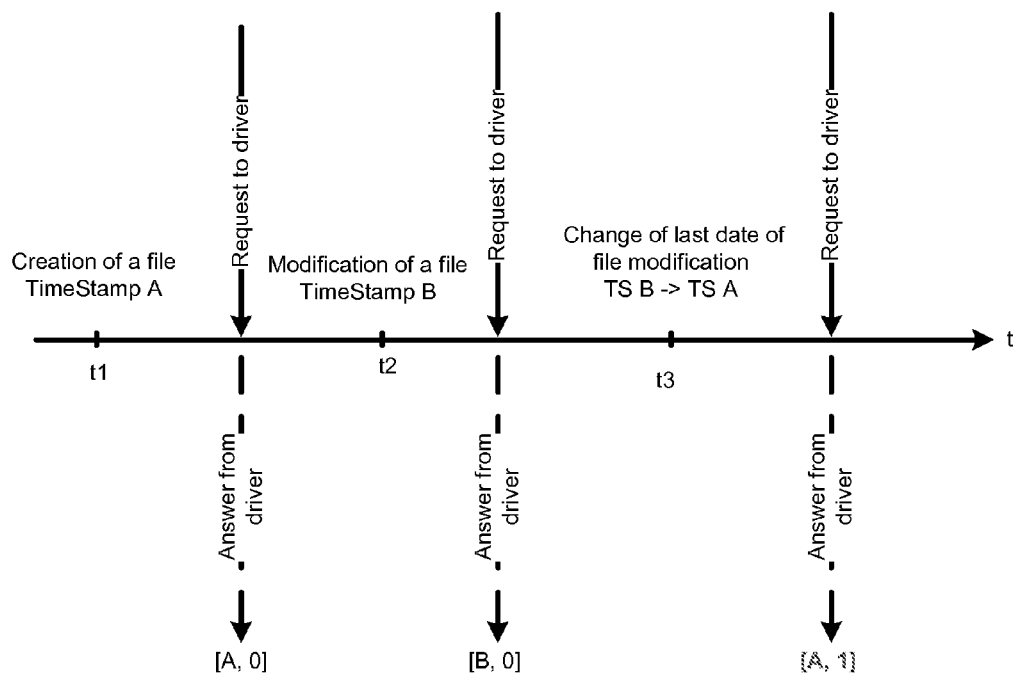
FIG. 1B illustrates a timeline of how the monitoring process that uses the present invention will identify, using a counter, that the file system's timestamp function cannot be relied upon.

FIG. 1B illustrates a timeline of how the monitoring that only relies not on the file system's timestamp function but also on the driver of the present invention cannot be subverted in the same manner as the file system's timestamp function alone. As shown in FIG. 1B, at time t1, the file has a Timestamp A, and a timestamp change counter (TSCOUNTER) value 0. After that point in time, a request to the driver (see 710 and discussion below) will produce a response that corresponds to the Timestamp A and counter TSCOUNTER value 0.

Subsequently the file has been modified and now has a Timestamp B, at the time t2. At that point, a request to the driver will result in a response that corresponds to the Timestamp B and a counter TSCOUNTER value 0.

At the time t3, a malicious application directly accesses the timestamps, and modifies the timestamp from B back to A, therefore a request to the driver after that point will produce a response that corresponds to the timestamp A, and the counter TSCOUNTER value of 1, which reflects the fact that the file timestamp has been modified in the meantime. In that event, the behavior of any other user applications can be changed to take this fact into account, for example, by informing the user of this fact or automatically starting a virus scan, etc.

Figure 2:
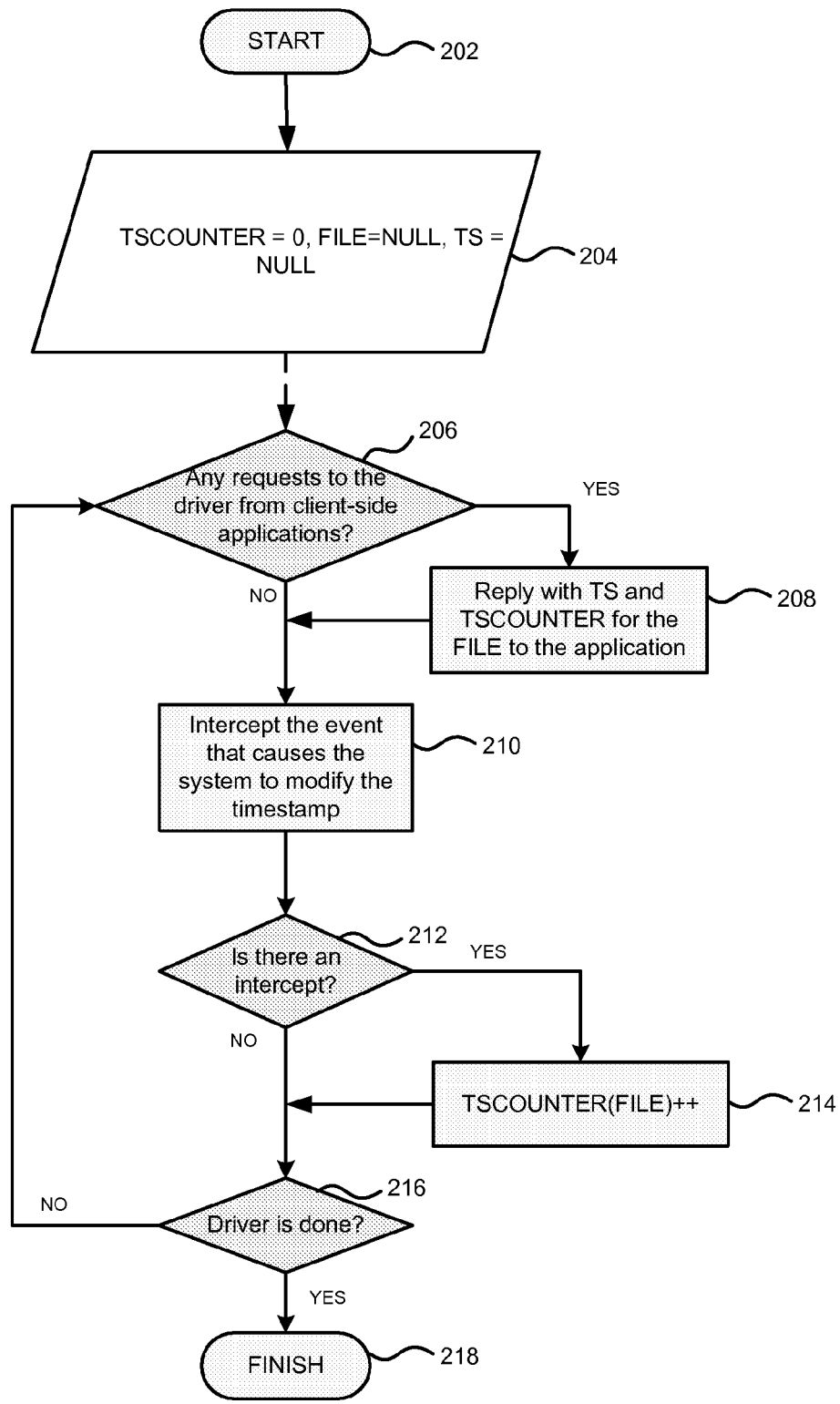
FIG. 2 illustrates the algorithm of the driver of one embodiment of the invention.

FIG. 2 illustrates the algorithm of the driver 710 (see FIG. 7) of one embodiment of the invention. The algorithm starts in step 202. In step 204, various initializations are executed. TSCOUNTER is a counter of the modifications for the FILE in the driver's database, FILE is a pointer to the object file being monitored, TS is the timestamp of the file. TSCOUNTER is set to 0, the pointer (FILE) to the file being monitored is set to null and the timestamp(TS) is also set to null.

In step 206, the driver 710 waits for requests from a monitoring application 704 (see FIG. 7) for the timestamp TS and the number of changes, as reported in the counter TSCOUNTER. If a request has been received, in step 208, the driver 710 returns the timestamp TS and the counter value TSCOUNTER for the particular file (identified by FILE), back to the monitoring application 704. If no requests have been received, the driver 710 intercepts events that cause the file system to modify the timestamp TS, regardless of their source, in step 210. In step 212, the driver 710 checks whether a system call to modify the timestamp TS has been intercepted. If the system call has been intercepted, then, in step 214, the driver 710 increments the counter TSCOUNTER for that file. In step 216, the driver 710 checks whether it needs to continue to be active. If the driver 710 is done, then the process finishes in step 218. Otherwise, the algorithm returns to step 206.

Figure 3:
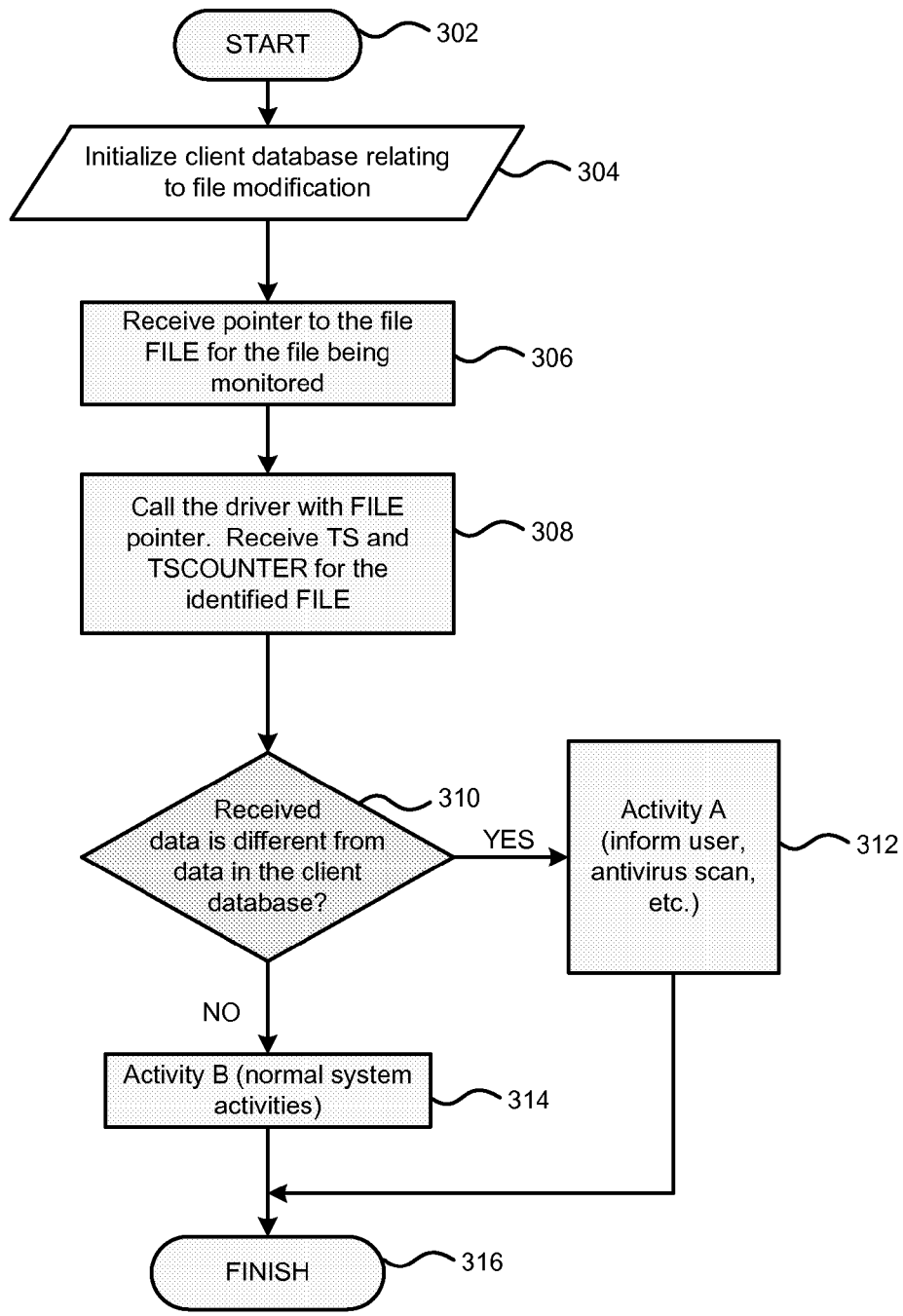
FIG. 3 illustrates how the application uses the driver described earlier to verify file integrity.

FIG. 3 illustrates how the monitoring application 704 uses the driver 710 described earlier to verify file integrity. As shown in FIG. 3, after the process starts in step 302, the monitoring application 704 accesses the database that it maintains, where the database relates to object (file) modification (step 304). In step 306, the pointer FILE to the file at issue is generated or received. In step 308, the monitoring application 704 calls the driver 710 using the pointer (FILE) to the particular file, and receives the timestamp TS and the counter value TSCOUNTER back from the driver 710. In step 310, the monitoring application 704 checks whether the data that it receives is different from the data in the monitoring database 706. The database is preferably maintained in operating system space, and is only accessible to the driver 710. If the data about timestamp modifications is different, then certain actions can be taken, e.g., informing the user (or running a virus scan, etc., see step 312.) If the data about timestamp modifications is the same, then, normal system activities can continue, see step 314. The process finishes in step 316.

Figure 4A:
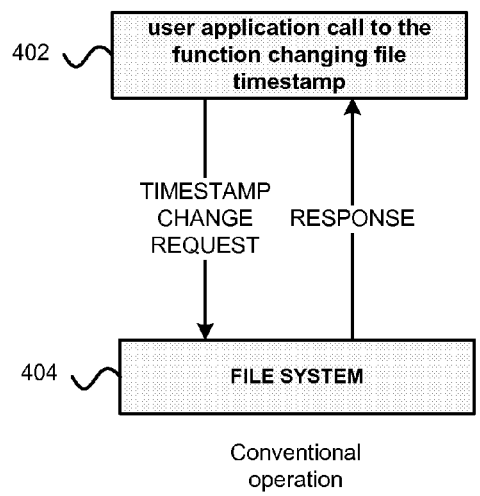
FIGS. 4A and 4B illustrate the addition of an interceptor for monitoring of timestamp change requests.
Figure 4B:
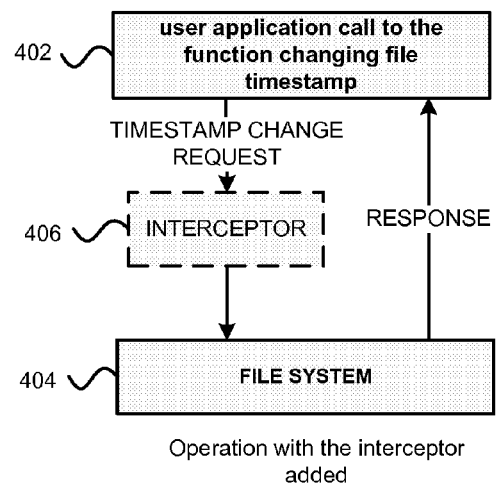

FIGS. 4A and 4B illustrate the addition of an interceptor to the scheme that affects the timestamps in the file system. In FIG. 4A, which shows a conventional approach, a user application 402 issues a call to the function SETFILETIME of the file system 404. (In this discussion, the file system is a Microsoft Windows file system, although the invention is not limited to MS Windows and the file system also includes standard operating system utilities and timestamp mechanisms.) The file system 404 then returns a response (the timestamp TS) back to the application 402.

As shown in FIG. 4B, the interceptor 406 is inserted between the user application 402 and the file system 404, such that any invocation of the timestamp change request function is intercepted by the interceptor 406.

Figure 5:
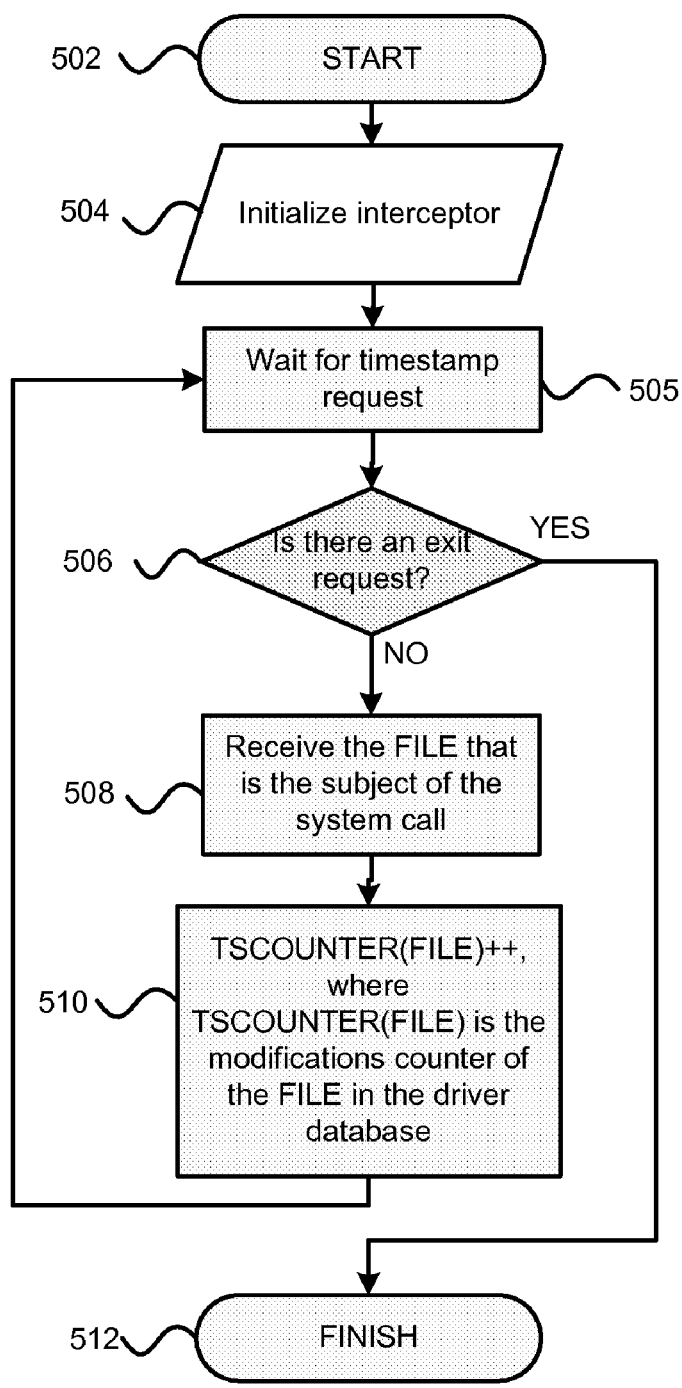
FIG. 5 illustrates the operation of the interceptor.

FIG. 5 illustrates operation of the interceptor 406. As shown in FIG. 5, after the algorithm starts in step 502, the interceptor 406 is initialized, in step 504. In step 506, the interceptor 406 awaits an invocation of the timestamp change request function (for example, the SETFILETIME function in MS Windows). The interceptor 406 then waits for attempts to invoke the timestamp change request function (505).

If a request to terminate the process is received, then the algorithm ends in step 512. Otherwise, if the timestamp change request has been received, then in step 508, the interceptor 406 identifies the file subject to the timestamp change request. In step 510, the interceptor 406 increments the counter value TSCOUNTER that corresponds to that file in its database, and the algorithm returns to step 505.

Figure 6:
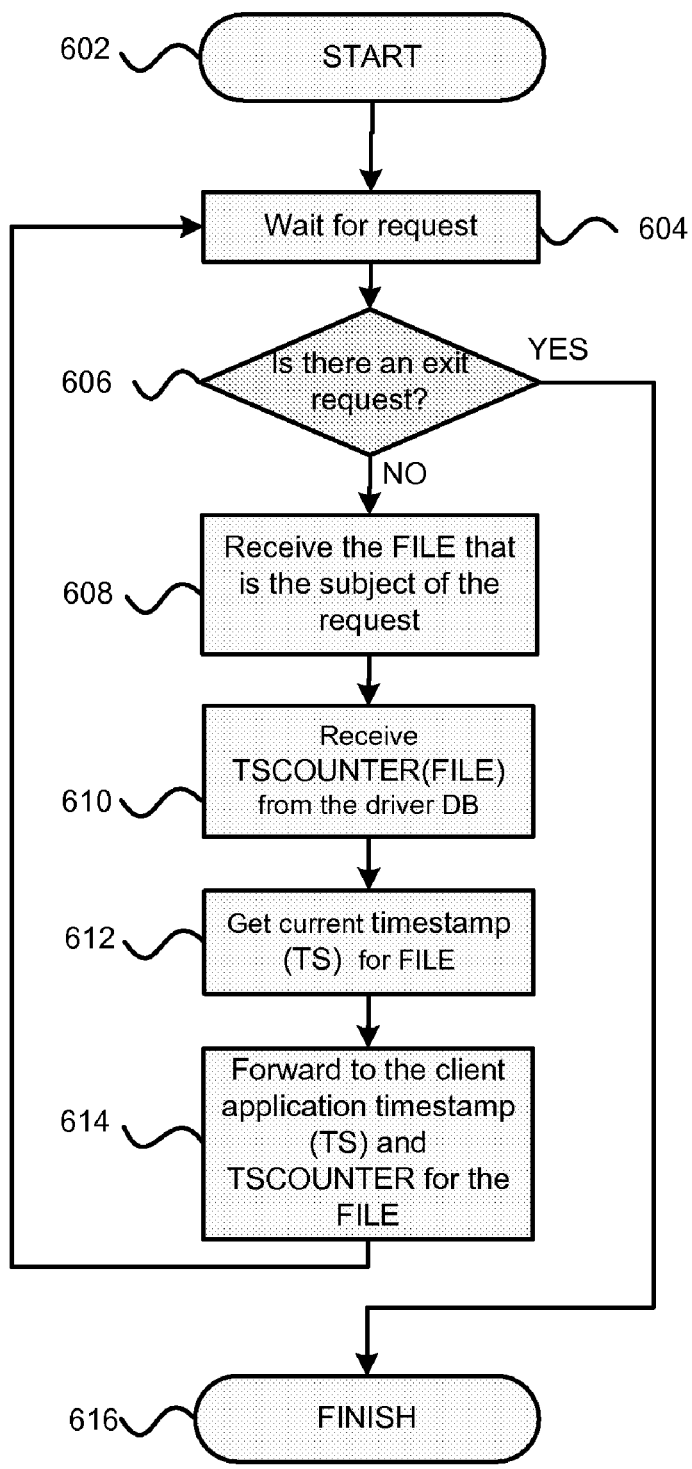
FIG. 6 illustrates the operation of the driver of one embodiment of the invention.

FIG. 6 illustrates the operation of the driver 710 of one embodiment of the invention. As shown in FIG. 6, once the driver 710 has been activated in step 602, the driver 710 then waits for a request for a timestamp (TS) from the monitoring application 704 in step 604. In step 606, if there is a request to terminate the driver, the algorithm ends in step 616. Otherwise, in step 608, the driver receives the file identifier FILE for the file at issue. In step 610, the driver 710 receives the value of the counter TSCOUNTER from its database for the identified file. In step 612, the driver 710 gets the current timestamp TS for the identified file. In step 614, the driver 710 returns back to the monitoring application 704 the current timestamp TS from the file system 404 and the counter value TSCOUNTER for that file. After that, the algorithm returns to step 604.

Figure 7:
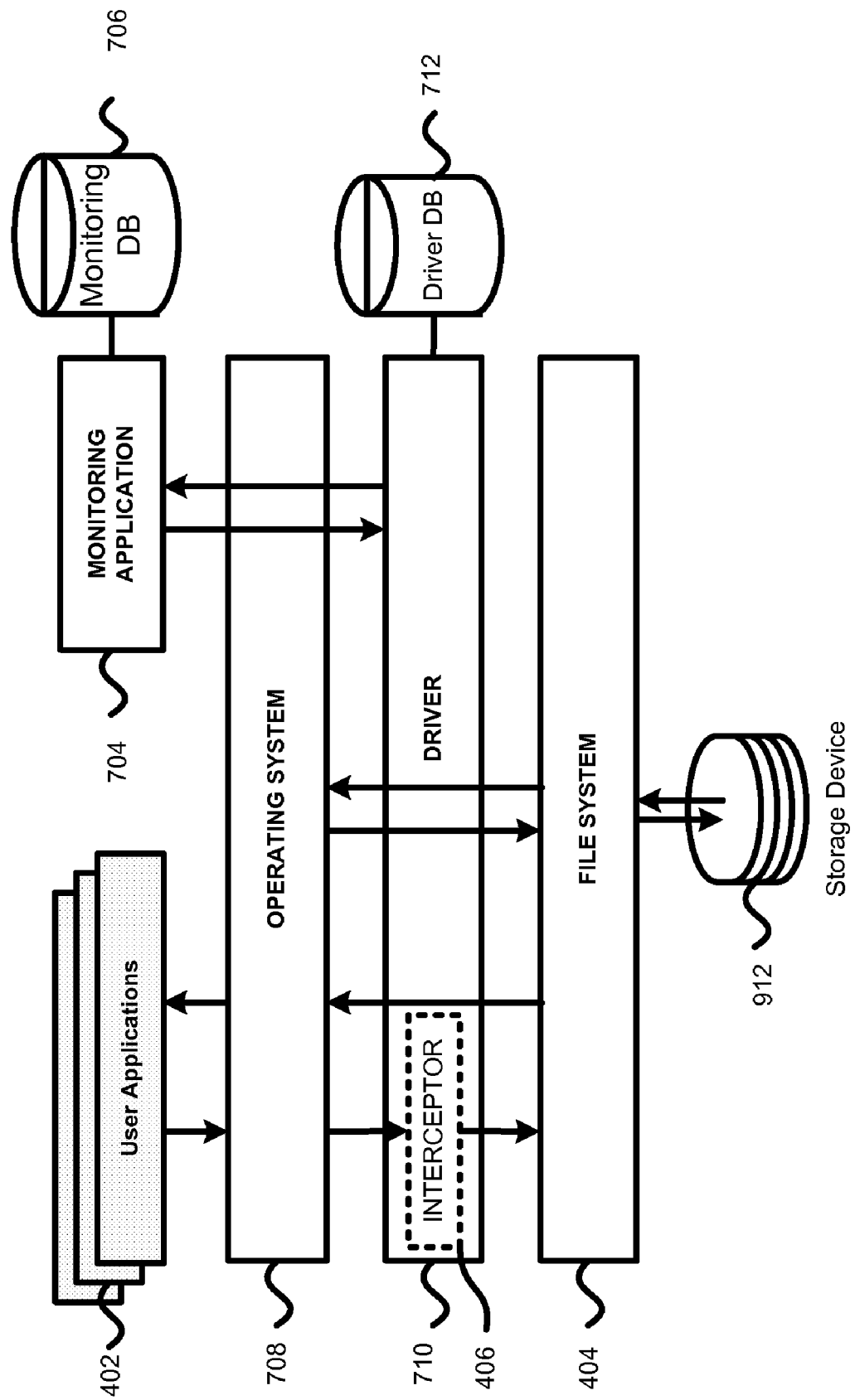
FIG. 7 illustrates, in block diagram form, the interaction between various elements, as contemplated in one embodiment of the invention.

FIG. 7 illustrates, in block diagram form, the interaction between various elements, as contemplated in one embodiment of the invention. As shown in FIG. 7, the file system 404 is stored on a storage device 912, see also FIG. 9. The file system 404 communicates with the operating system 708 through the driver 710, which includes the interceptor 406 discussed earlier. The driver 710 has a database 712, which stores the file identifiers, and counter values for those files. User applications 402 can issue file access calls to the operating system 708, which passes them to the file system 404 through the driver 710. A particular monitoring application 704 that is interested in monitoring file integrity also communicates with the driver 710 and has a monitoring database 706, where it stores values of the timestamp TS and the counter TSCOUNTER for each file from the driver 710, which it can later compare with the values in the driver database 712.

Figure 8:
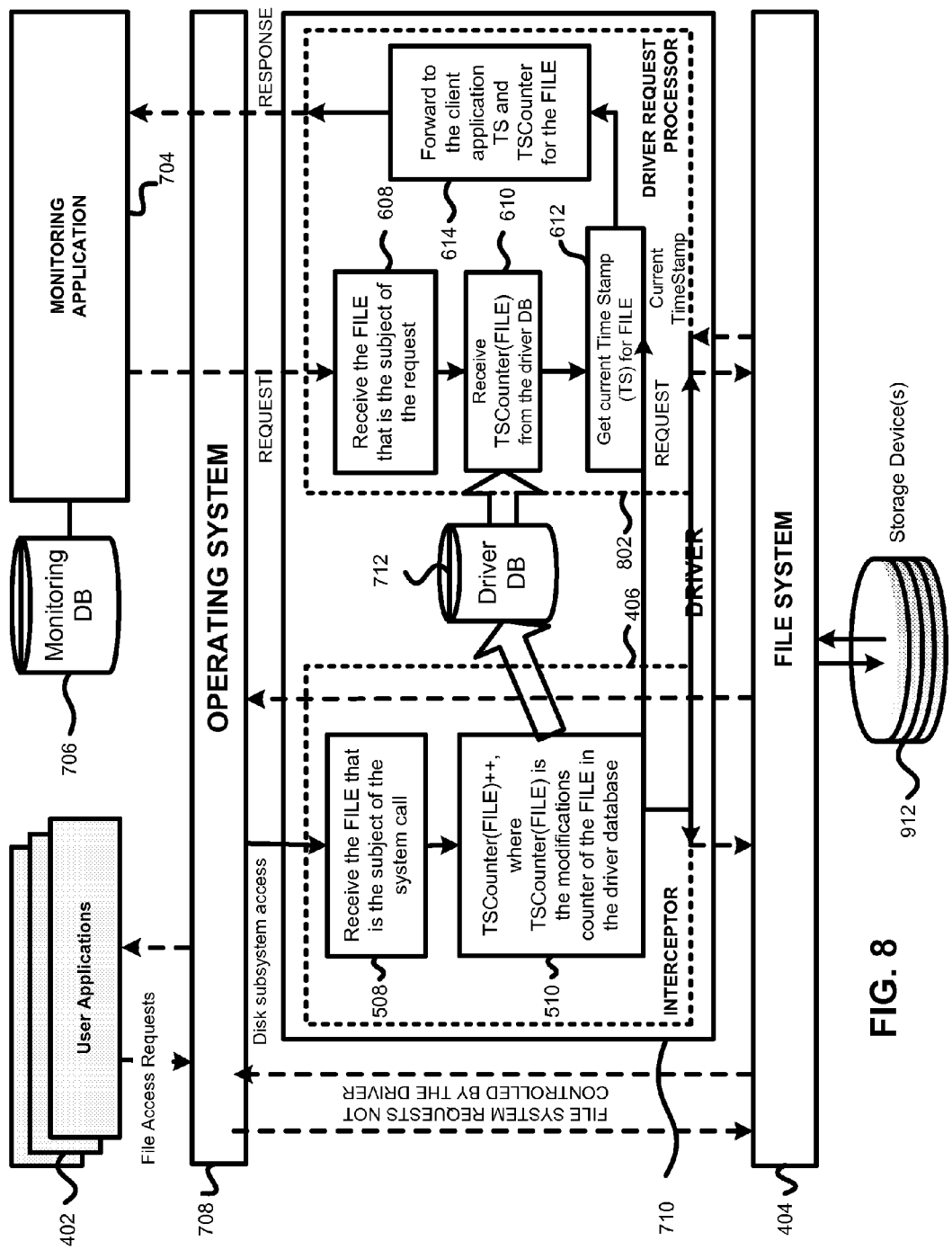
FIG. 8 illustrates another diagram that shows the behavior of the driver of the present invention.

FIG. 8 illustrates how the driver 710 of the present invention interacts with the various elements at issue. As shown in FIG. 7, various user applications 402 that access the file system 404 through the operating system 708 issue file access requests. The operating system 708 passes those file access requests to the file system 404. Some of these file access requests are not subject to monitoring (e.g., for files that are not being monitored), and therefore are passed to the file system 404 directly. Other file system requests are subject to monitoring and therefore are handled by the driver 710, which includes the interceptor 406. The interceptor 406 receives the file identifier (FILE) and increments the counter TSCOUNTER, which is reflected in the driver database 712.

When the monitoring application 704 needs to verify whether something has been written to the file without it being reflected in the timestamp TS, the monitoring application 704 issues a request to the driver 710, which is handled by the driver request processor 802. The driver request processor 802 receives the file identifier, then queries the driver database 712 for the counter value and gets current timestamp TS. The counter TSCOUNTER value and the timestamp TS are then returned back to the monitoring application 704.

Although the invention is applicable to antivirus software, the invention is not limited to this application. Other anti-malware applications are also possible, for example, various anti-spyware, anti-adware, firewall software, etc., can also benefit from it. If there is a set of files whose integrity the user needs to monitor closely, for example, due to frequent updates, or for any other reason, this approach works in that situation as well.

Figure 9:
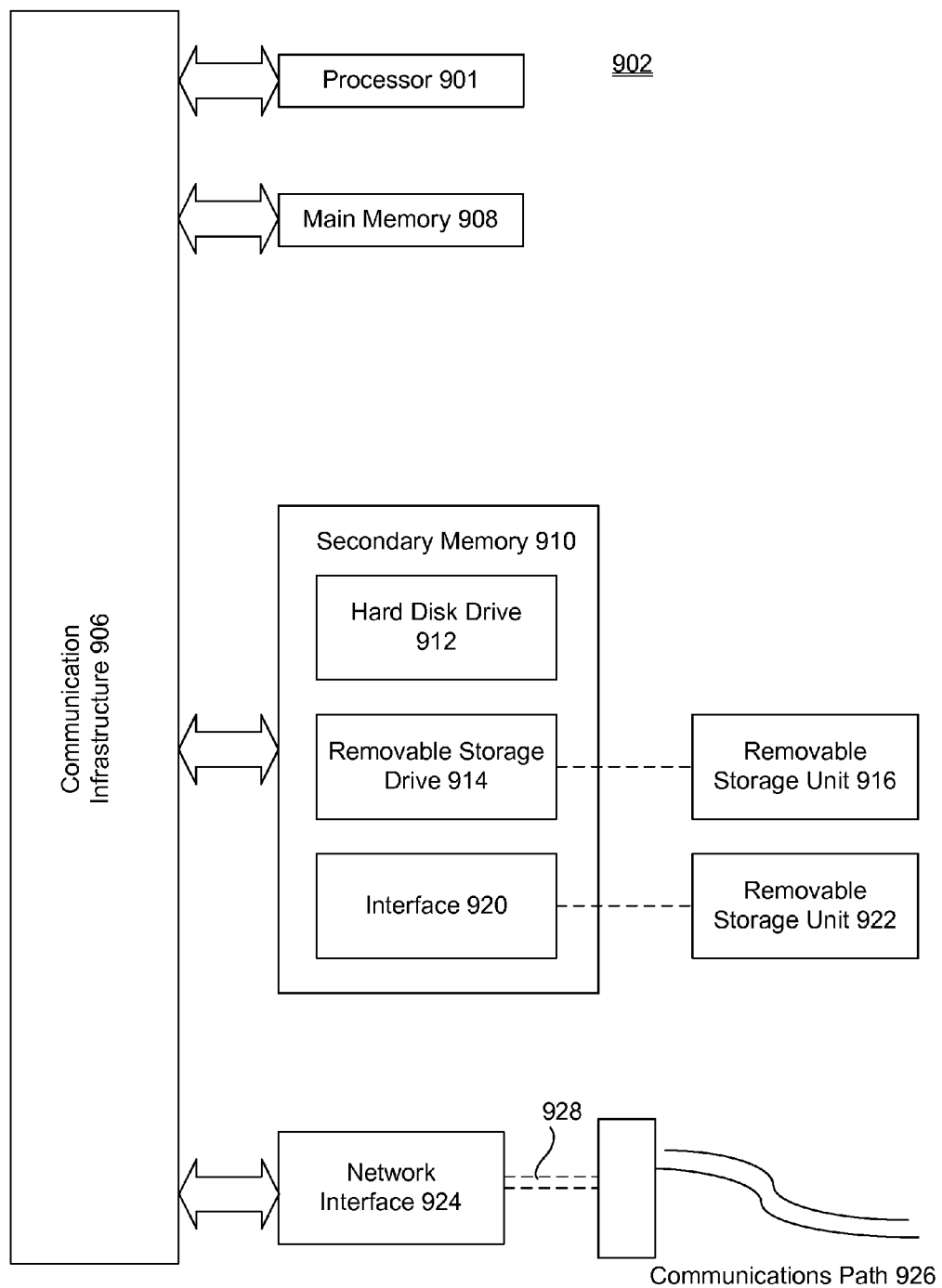
FIG. 9 illustrates an example of a computer on which the invention may be implemented.

An example of the computing system on which the present invention can be implemented, such as the client-side computer 902 is illustrated in FIG. 9. The computing system 902 includes one or more processors, such as processor 901. The processor 901 is connected to a communication infrastructure 906, such as a bus or network. Various software implementations are described in terms of this exemplary computer system. After reading this description, it will become apparent to a person skilled in the relevant art how to implement the invention using other computer systems and/or computer architectures.

Computing system 902 also includes a main memory 908 (usually random access memory (RAM)), and may also include a secondary memory 910. The secondary memory 910 may include, for example, a hard disk drive 912 and/or a removable storage drive 914, representing a magnetic tape drive, an optical disk drive, etc. The removable storage drive 914 reads from and/or writes to a removable storage unit 916 using a corresponding interface. Removable storage unit 916 represents a magnetic tape, optical disk, or other storage medium that is READ by and written to by removable storage drive 914. As will be appreciated, the removable storage unit 918 can include a computer usable storage medium having stored therein computer software and/or data.

In alternative implementations, secondary memory 910 may include other means for allowing computer programs or other instructions to be loaded into computing system 902. Such means may include, for example, a removable storage unit 922 and an interface 920. An example of such means may include a removable memory chip (such as an EPROM, or PROM) and associated socket, or other removable storage units 922 and interfaces 920 which allow software and data to be transferred from the removable storage unit 22 to computing system 902.

Computing system 902 may also include one or more communications interfaces, such as communications interface 924. Communications interface 924 allows software and data to be transferred between computing system 902 and external devices. Examples of communications interface 924 may include a modem, a network interface (such as an Ethernet card), a communications port, a PCMCIA slot and card, etc. Software and data transferred via communications interface 924 are in the form of signals 928 which may be electronic, electromagnetic, optical or other signals capable of being received by communications interface 924. These signals 928 are provided to communications interface 924 via a communications path (i.e., channel) 926. This channel 926 carries signals 928 and may be implemented using a wire or cable, fiber optics, an RF link and other communications channels. In an embodiment of the invention, signals 928 comprise data packets sent to processor 901. Information representing processed packets can also be sent in the form of signals 928 from processor 901 through communications path 926.

The terms "computer program medium" and "computer usable medium" are used to generally refer to media such as removable storage units 916 and 922, a hard disk installed in hard disk drive 912, and signals 928, which provide software to the computing system 902.

Computer programs are stored in main memory 908 and/or secondary memory 910. Computer programs may also be received via communications interface 924. Such computer programs, when executed, enable the computing system 902 to implement the present invention as discussed herein. In particular, the computer programs, when executed, enable the processor 901 to implement the present invention. Where the invention is implemented using software, the software may be stored in a computer program product and loaded into computing system 902 using removable storage drive 914, hard drive 912 or communications interface 924.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A computer implementable method of monitoring file integrity comprising computer-executable code stored on a computer-readable medium, for performing the steps of:
   (a) intercepting an operating system request to change a timestamp of a file by detecting an invocation of the operating system timestamp change function;
   (b) in an antivirus application, maintaining a counter of a number of times the timestamp change function was invoked;
   (c) updating the counter each time the timestamp change function is invoked to change the timestamp;
   (d) in the antivirus application, comparing the counter to a prior value, so as to detect a change of the timestamp using the operating system timestamp function that occurred without a file system writing to the file, where the counter changed but the timestamp of the file does not accurately reflect the change; and
   (e) performing additional analysis of the file by the antivirus application if the counter does not match the prior value that was maintained by the antivirus application.

2. The method of claim 1, wherein steps (a)-(d) are performed for multiple files, and wherein each file has a corresponding counter and a corresponding timestamp.

3. The method of claim 2, wherein the counters are maintained in a database.

4. The method of claim 2, wherein the antivirus application maintains a database of a number of times the timestamps of the files have been modified.

5. The method of claim 1, wherein the operating system timestamp change request is generated by a user application.

6. The method of claim 1, wherein access to the counter is restricted to a timestamp monitoring driver that maintains the counter.

7. The method of claim 1, wherein access to the counter is granted to a timestamp monitoring driver that maintains the record.

8. A system for monitoring file integrity, the system comprising:
   a processor;
   a memory operatively coupled to the processor;
   computer loaded into the memory, the computer code implementing the following functionality:
   an operating system timestamp change function that sets a file modification time upon invocation;
   an interceptor that detects when the timestamp change function is invoked without using a file system to write to the file;
   a record associated with the file and updated when a timestamp of the file is changed using the timestamp change function, the record including a counter of a number of times the timestamp has been modified using the operating system timestamp change function; and
   an antivirus application that changes its behavior if a current value of the counter does not correspond to the a prior value of the counter maintained by the antivirus application, where the counter changed but the timestamp of the file does not accurately reflect the change,
   wherein the antivirus application performs additional antivirus analysis of the file if the current value and the prior value of the counter do not match.

9. The system of claim 8, wherein the system maintains records for multiple files, and wherein each file has a corresponding record.

10. The system of claim 9, wherein the records are maintained in a database.

11. The system of claim 8, further comprising a antivirus application database that the antivirus application uses to compare the record of the driver with its own records.

12. The system of claim 8, wherein the record contains an update on each invocation of the operating system timestamp change function.

13. The system of claim 8, wherein the antivirus application maintains a database of timestamp counters.

14. A computer useable storage medium having computer program logic for monitoring file integrity stored thereon, the computer program logic used for executing on a processor, the computer program logic comprising:
   computer program code means for intercepting an operating system request to change a timestamp of a file by detecting an invocation of the operating system timestamp change function;
   in an antivirus application, computer program code means for maintaining a counter of a number of times the timestamp change function was invoked
   computer program code means for updating the counter each time the timestamp change function is invoked to change the timestamp;
   in the antivirus application, computer program code means for comparing the counter to a prior value, so as to detect a change of the timestamp using the operating system timestamp function that occurred without a file system writing to the file, where the counter changed but the timestamp of the file does not accurately reflect the change; and
   computer program code means for performing additional analysis of the file by the antivirus application if the counter does not match the prior value that was maintained by the antivirus application.

15. A computer implementable method of monitoring file integrity comprising computer-executable code stored on a computer-readable medium, for performing the steps of:
   (a) intercepting a system request to change a timestamp of a file;
   (b) updating a record of a number of times the timestamp has been changed;
   (c) in response to an antivirus application requesting the record, providing, to the antivirus application, the record for comparison with information maintained by the antivirus application; and (d) changing behavior of a user application if the record does not correspond to the information maintained by the antivirus application, where the record changed but the timestamp of the file does not accurately reflect the change.

16. The method of claim 1, wherein the antivirus application stores a previous value of the timestamp and also compares the previous value of the timestamp to a current value of the timestamp.

17. The method of claim 1, further comprising automatically starting an antivirus scan of the file if the counter changed but the timestamp of the file does not accurately reflect the change.

18. The method of claim 6, further comprising querying the monitoring driver for the timestamp and the counter value.

19. The method of claim 2, wherein steps (a)-(d) are performed for some, but not for all, files of the file system.

\* \* \* \* \*